US011080771B2

(12) United States Patent
Turlay et al.

(10) Patent No.: US 11,080,771 B2
(45) Date of Patent: *Aug. 3, 2021

(54) SELF-CHECKOUT SYSTEM FOR BYPASSING IN-STORE CHECKOUT

(71) Applicant: Maplebear, Inc., San Francisco, CA (US)

(72) Inventors: Emmanuel Jean Yves Turlay, San Francisco, CA (US); Elizabeth Ruth Barnum, San Francisco, CA (US); Ashu Khaitan, San Francisco, CA (US); Moses Yung Kyu Lee, San Francisco, CA (US); Denise Hoi Shuen Leung, San Mateo, CA (US); Arnaud Nicolas Ferreri, San Francisco, CA (US); David Schwantes, Berkeley, CA (US)

(73) Assignee: Maplebear, Inc., San Francisco, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/547,597

(22) Filed: Aug. 22, 2019

(65) Prior Publication Data

US 2019/0378198 A1  Dec. 12, 2019

Related U.S. Application Data (63) Continuation of application No. 15/258,942, filed on Sep. 7, 2016, now Pat. No. 10,438,274.

(51) Int. Cl.
| | |
|---|---|
| *G06Q 30/06* | (2012.01) |
| *G06Q 20/18* | (2012.01) |
| *G07G 1/00* | (2006.01) |
| *G06Q 20/20* | (2012.01) |
| *G06Q 20/32* | (2012.01) |
| *G06Q 10/08* | (2012.01) |

(52) U.S. Cl.
CPC ....... *G06Q 30/0601* (2013.01); *G06Q 10/087* (2013.01); *G06Q 20/18* (2013.01);
(Continued)

(58) Field of Classification Search
CPC .......... G06Q 30/0633; G06Q 30/0601; G06Q 20/18; G06Q 20/20; G06Q 20/3276; G07G 1/0045; G07G 1/0081; G07G 1/009
(Continued)

(56) References Cited

U.S. PATENT DOCUMENTS

| 7,747,543 B1 | 6/2010 | Braumoeller et al. |
| 2002/0026380 A1 | 2/2002 | Su |

(Continued)

FOREIGN PATENT DOCUMENTS

WO  WO-2013163103 A1 * 10/2013 ............. G06Q 20/20

OTHER PUBLICATIONS

IP Australia, Examination Report No. 3, AU Patent Application No. 2017324327, dated May 13, 2020, seven pages.
(Continued)

*Primary Examiner* — Yogesh C Garg
(74) *Attorney, Agent, or Firm* — Fenwick & West LLP (57) ABSTRACT

An online shopping concierge service allows shoppers to purchase items on behalf of customers and checkout using a mobile application, circumventing traditional point-of-sale check-out systems. A customer places an order using a mobile application or website associated with the online shopping concierge service. The online shopping concierge service charges a payment instrument of the customer in the value of the selected items. The system transmits the order to a shopper, who receives an order for fulfillment on a mobile device. The shopper collects and scans items using a mobile application. The mobile application transmits an
(Continued)

identification of the items for purchase and their total cost to the online shopping concierge service, which transmits payment to the retailer. Alternatively, the mobile application encodes an identification of the items for purchase into an encoded image, which is scanned by a cashier, allowing the shopper to complete an accelerated check-out.

18 Claims, 7 Drawing Sheets

(52) U.S. Cl.
CPC ......... *G06Q 20/20* (2013.01); *G06Q 20/3276* (2013.01); *G06Q 30/0633* (2013.01); *G07G 1/009* (2013.01); *G07G 1/0045* (2013.01); *G07G 1/0081* (2013.01)

(58) Field of Classification Search
USPC .......................................... 705/26.1, 26.8, 28
See application file for complete search history.

(56) References Cited

U.S. PATENT DOCUMENTS

| | | |
|---|---|---|
| 2008/0201241 A1 | 8/2008 | Pecoraro |
| 2011/0029344 A1 | 2/2011 | Weiler et al. |
| 2012/0095853 A1 | 4/2012 | von Bose et al. |
| 2013/0191213 A1* | 7/2013 | Beck .................. G06Q 30/0207 705/14.53 |
| 2013/0256403 A1 | 10/2013 | MacKinnon Keith |
| 2014/0201001 A1 | 7/2014 | Rellas et al. |
| 2014/0244411 A1 | 8/2014 | Kim et al. |
| 2014/0249941 A1 | 9/2014 | Hicks et al. |
| 2015/0025969 A1 | 1/2015 | Schroll et al. |
| 2015/0134470 A1 | 5/2015 | Hejl et al. |
| 2016/0005019 A1 | 1/2016 | Paulo Rodrigues |
| 2016/0048799 A1* | 2/2016 | Meyer ................ G06Q 10/0833 705/333 |
| 2016/0063609 A1 | 3/2016 | Argue et al. |
| 2016/0203536 A1 | 7/2016 | Termolle et al. |
| 2017/0075962 A1* | 3/2017 | Hitchcock .............. G06Q 10/08 |
| 2017/0161728 A1 | 6/2017 | Satyanarayan et al. |
| 2017/0193586 A1* | 7/2017 | Yuan .................. G06Q 30/0625 |
| 2017/0316656 A1 | 11/2017 | Chaubard et al. |
| 2018/0240088 A1* | 8/2018 | Nelms ................ G06Q 30/0641 |

OTHER PUBLICATIONS

PCT International Search Report and Written Opinion, PCT Application No. PCT/US2017/050114, dated Nov. 13, 2017, 17 pages.
United States Office Action, U.S. Appl. No. 15/258,942, dated Jan. 30, 2019, 18 pages.

* cited by examiner

SELF-CHECKOUT SYSTEM FOR BYPASSING IN-STORE CHECKOUT

CROSS REFERENCE TO RELATED APPLICATIONS

This application is a continuation of prior, co-pending U.S. application Ser. No. 15/258,942, filed on Sep. 7, 2016, which is incorporated herein by reference in its entirety for all purposes.

BACKGROUND

This invention relates generally to self-checkout technologies, and more specifically to checking out using a mobile application. Shoppers fulfill orders at a physical retailer on behalf of customers, as part of an online shopping concierge service. Once a shopper has collected one or more items for purchase, the shopper must wait in line and purchase the items according to the traditional check-out process. This is a time-consuming process, and because shoppers use a mobile device to scan and record items each item picked up for purchase, involves redundant activity. A more efficient check-out process allows the shopper to complete purchase of selected items on his/her mobile device, thereby eliminating redundant actions and reducing the time required to fulfill an order.

SUMMARY

Embodiments of the invention enable a shopper to bypass a physical check-out process at a retailer by completing his/her purchase via a mobile application on the shopper's phone. In one embodiment, the shopper is shopping at the retailer on behalf of a customer, who specified a list of items for the shopper to purchase via an online shopping concierge service. The customer places an order using a website or client application that communicates with the online shopping concierge service. The order specifies one or more items to be purchased at a retailer. The online shopping concierge service collects payment from the customer and transmits the order to a shopper. The shopper travels to one or more retailers to fulfill the order. While at a retailer, the shopper collects and scans each item using a shopper mobile application that runs on the shopper's mobile device. The shopper mobile application records quantitative and qualitative information describing each product and produces a basket of items for purchase. The shopper mobile application transmits information describing the basket to the online shopping concierge service, which determines a total value for the basket of goods. The online shopping concierge service transmits payment to a system associated with the retailer, thereby completing purchase of the basket of items. The shopper then leaves the store and delivers the purchased items to the customer.

In another embodiment, the shopper performs an accelerated check-out using his/her specialized mobile application. Once the shopper has collected all of the items requested in the order, the shopper mobile application encodes the basket details into a scannable image containing a machine-readable code, such as a QR code. The machine-readable code contains information that describes the items in the shopper's basket, or a link thereto. A cashier, employee, or automated scanner at the physical check-out scans the encoded image, causing the details of each item in the basket to be transmitted to the retailer without requiring that each item be individually scanned.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment of a Shopping Assistance Platform

Figure 1:
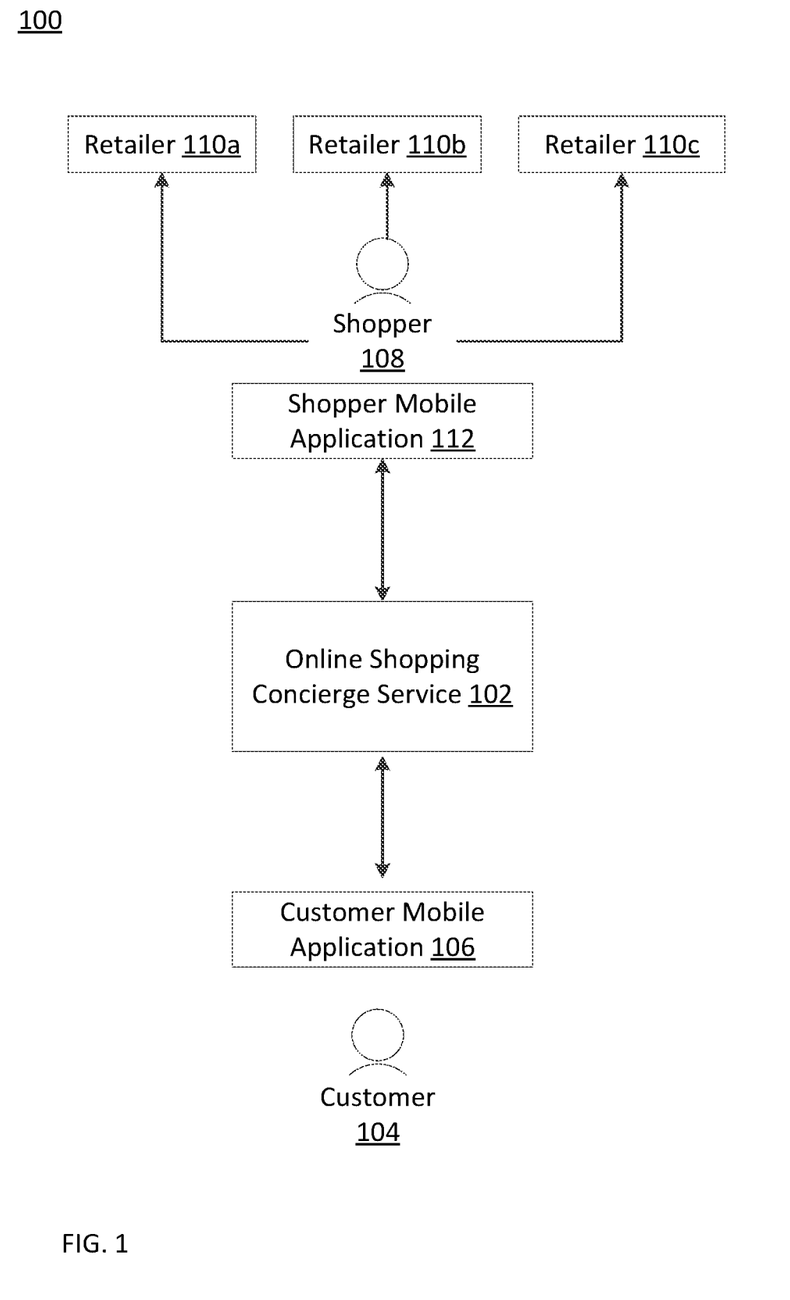
FIG. 1 illustrates and environment of an online shopping concierge service, according to one embodiment.

FIG. 1 illustrates the environment of a shopping assistance platform, according to one embodiment. The environment 100 includes an online shopping concierge service 102. The system 102 is configured to receive orders from one or more customers 104 (only one is shown for the sake of simplicity). An order specifies a list of goods (items or products) to be delivered to the customer 104. In some embodiments, the order specifies one or more retailers from which the selected items should be purchased. The customer may use a customer mobile application (CMA) 106 to place the order; the CMA 106 is configured to communicate with the shopping assistance platform 102.

The system 102 is configured to transmit orders received from customers 104 to one or more shoppers 108. A shopper 108 may be a contractor, employee, or other person (or entity) who is enabled to fulfill orders received from the online shopping concierge service 102. The environment 100 also includes three retailers 110a, 110b, and 110c (only three are shown for the sake of simplicity; the environment could include hundreds of retailers). Each shopper 108 fulfills an order received from the online shopping concierge service 102 at one or more retailers 110 and delivers the order to the customer 104. In one embodiment, shoppers 108 make use of a shopper mobile application 112 which is configured to interact with the online shopping concierge service 102.

Online Shopping Concierge Service

Figure 2:
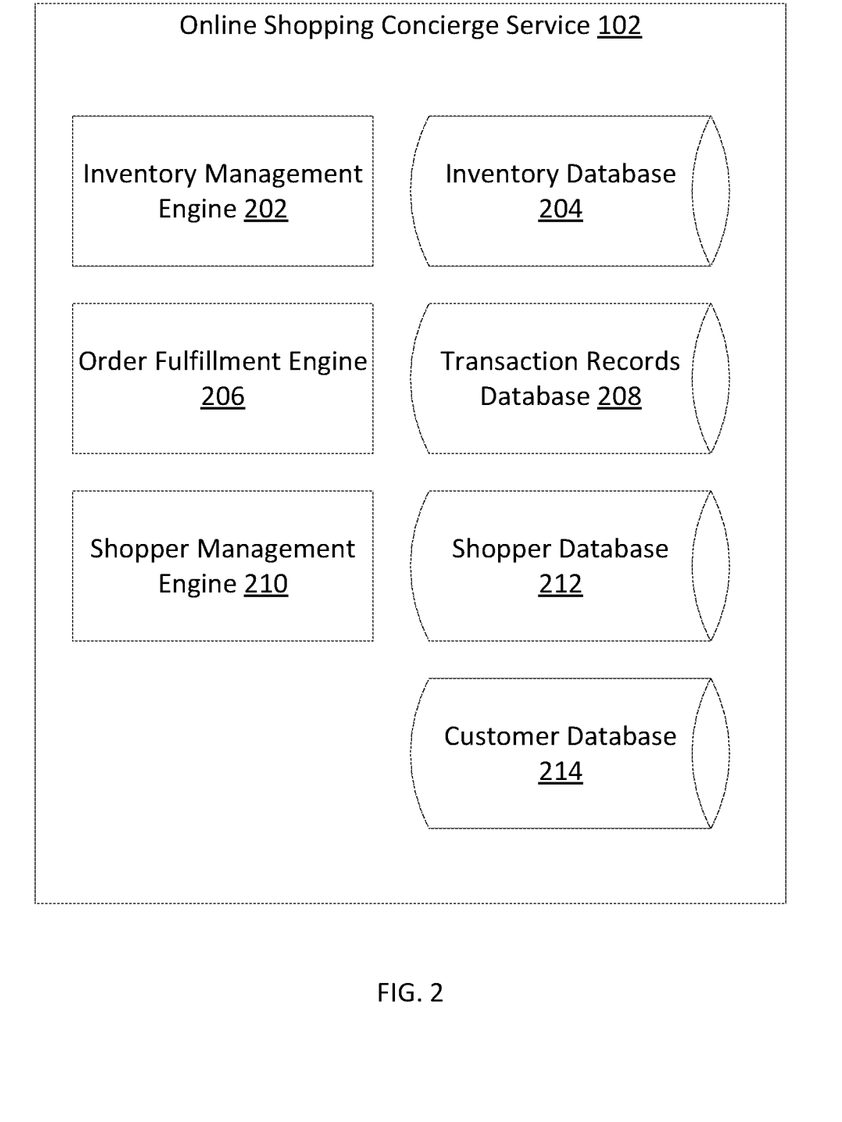
FIG. 2 is a diagram of an online shopping concierge service, according to one embodiment.

FIG. 2 is a diagram of an online shopping concierge service, according to one embodiment. The online shopping concierge service 112 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The management engine 202 is also configured to store inventory records in an inventory database 204. The inventory database 204 may store information in separate records—one for each participating retailer 110, or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the database 204.

The online shopping concierge service 102 also includes an order fulfillment engine 206 which is configured to synthesize and display an ordering interface to each customer 104 (for example, via the customer mobile application 106). The engine 206 is also configured to access the inventory database 204 in order to determine which products are available at which retailers 110. The engine 206 determines a sale price for each item ordered by a customer 104. Prices set by the engine 206 may or may not be identical to in-store prices determined by retailers 110 (which is the price that customers 104 and shoppers 108 would pay at the retailer 110). The order fulfillment engine 206 also facilitates transactions associated with each order. In one embodiment, the engine 206 charges a payment instrument associated with a customer 104 when he/she places an order. The engine 206 may transmit payment information to an external payment gateway or payment processor. The engine 206 stores payment and transactional information associated with each order in a transaction records database 208.

In some embodiments, the order fulfillment engine 206 also shares order details with retailers 110. For example, after successful fulfillment of an order, the engine 206 may transmit a summary of the order to the appropriate retailer. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 210 may interact with a shopper management engine 210, which manages communication with and utilization of shoppers 108. In one embodiment, the shopper management engine 210 receives a new order from the order fulfillment engine 206. The shopper management engine 210 identifies the appropriate shopper 108 to fulfill the order based on one or more parameters, such as the shopper's proximity to the appropriate retailer 110 (and/or to the customer 104), his/her familiarity level with that particular retailer 110, and so on. Additionally, the shopper management engine 210 accesses a shopper database 212 which stores information describing each shopper 108, such as his/her name, gender, rating, previous shopping history, and so on.

Finally, as part of fulfilling an order, the order fulfillment engine 206 may access a customer database 214 which stores information describing each customer. This information could include each customer's name, address, gender, shopping preferences, favorite items, stored payment instruments, and so on.

Figure 3A:
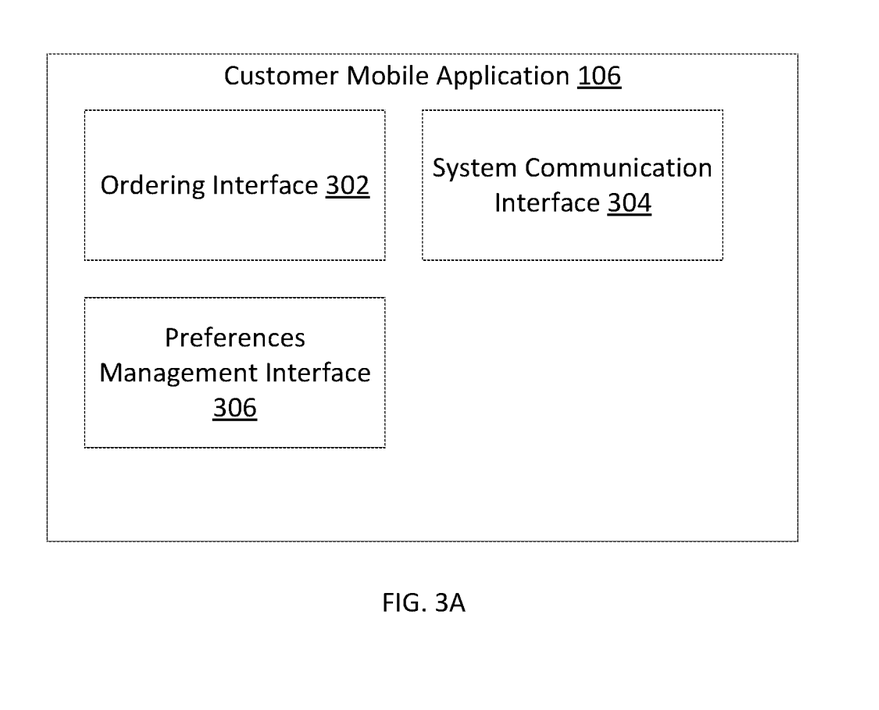
FIG. 3A is a diagram of a customer mobile application (CMA) 106, according to one embodiment.

FIG. 3A is a diagram of the customer mobile application (CMA) 106, according to one embodiment. The CMA includes an ordering interface 302, which provides an interactive interface with which the customer 104 can browse through and select products and place an order. The CMA also includes a system communication interface 304 which, among other functions, receives inventory information from the online shopping concierge service 102 and transmits order information to the system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
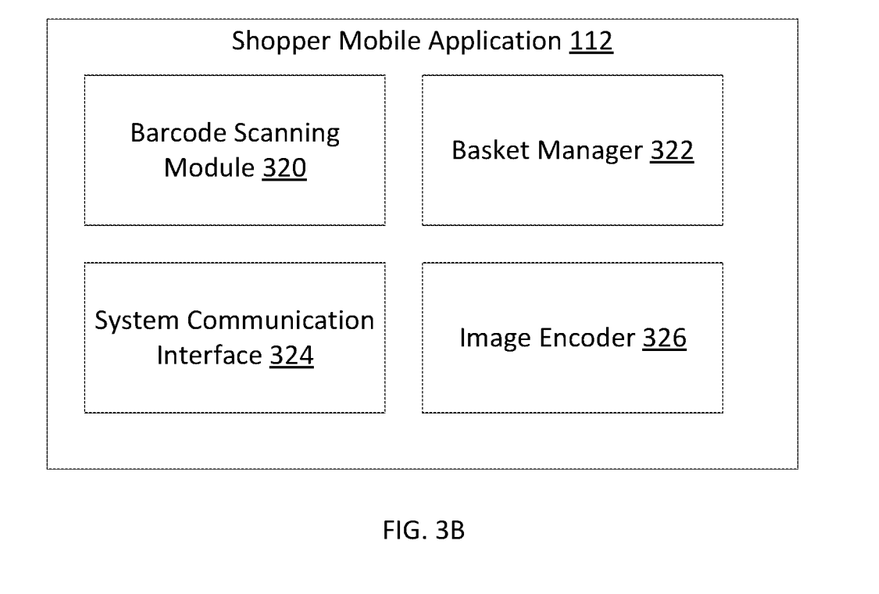
FIG. 3B is a diagram of a shopper mobile application (SMA) 112, according to one embodiment.

FIG. 3B is a diagram of the shopper mobile application (SMA) 112, according to one embodiment. The SMA includes a barcode scanning module 320 which allows a shopper 108 to scan an item at a retailer 108 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a retailer 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge service 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

Bypass Checkout Via Mobile Device

As described with reference to FIG. 3A, the CMA 106 is used by the shopper to scan and record pricing, quantity, and other information describing each item in an order. The barcode scanning module 320 allows a shopper 108 to simply scan a barcode attached to an item (or enter information manually if necessary); the basket manager 322 maintains and updates a record of all items being collected by the shopper 108 for a particular order. In some embodiments, the online shopping concierge service 102, subsequent to receiving an identification of items for purchase, can perform a "bypass checkout" in which it transmits payment to the appropriate retailer 110 on behalf of the shopper 108, thereby removing the need for the shopper 108 to wait in line at a physical point-of-sale (such as a check-out counter) within the retailer.

Figure 4A:
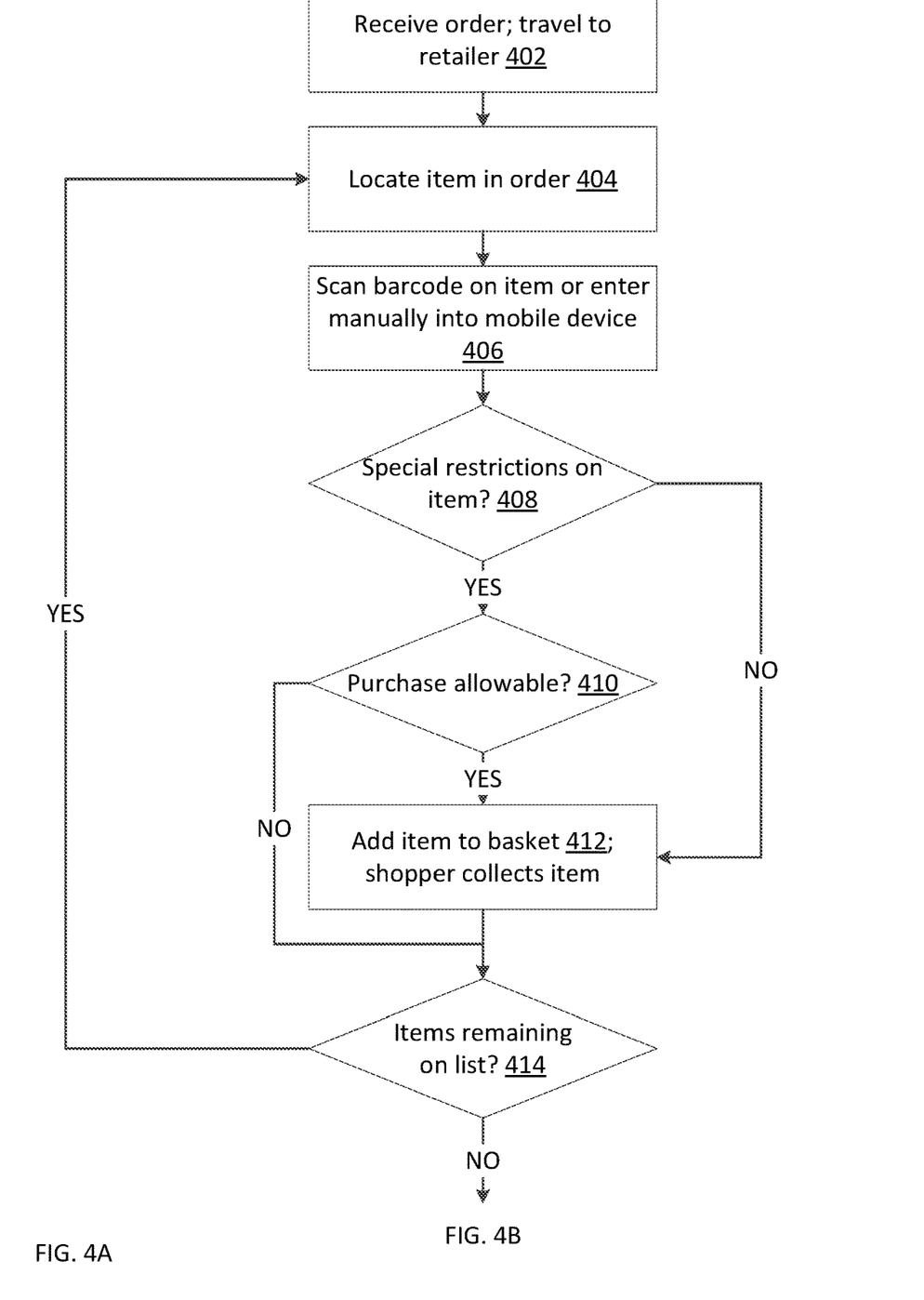
FIGS. 4A and 4B contain a flowchart illustrating a process of performing a bypass checkout using a shopper mobile application, according to one embodiment.
Figure 4B:
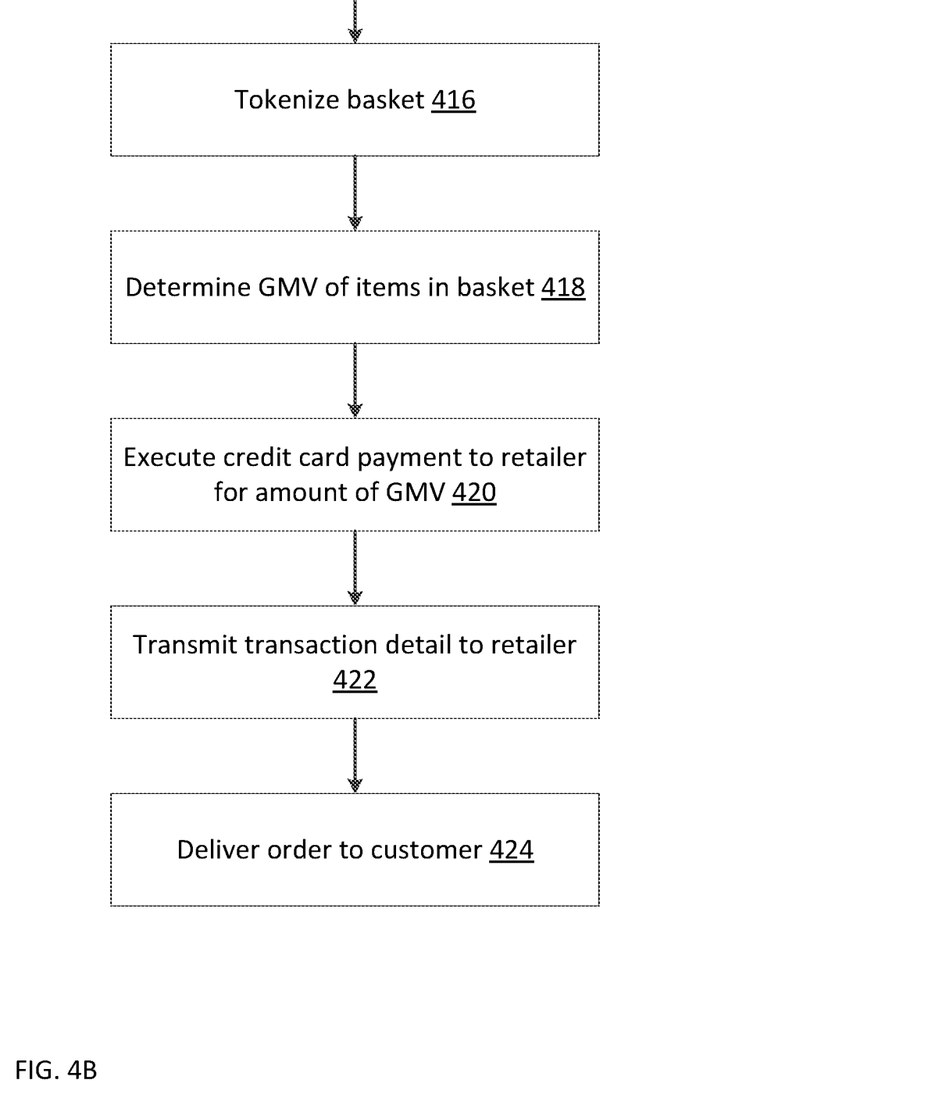

FIGS. 4A and 4B illustrate the process of performing a bypass checkout using a shopper mobile application, according to one embodiment. A shopper receives 402 an order to be fulfilled (from the online shopping concierge service) and travels to an appropriate retailer. The appropriate retailer may be communicated by the online shopping concierge service along with the order details, or it may be left to the discretion of the shopper. The shopper locates 404 an item specified by the order. The shopper scans 406 the item using a shopper mobile application; the shopper may also manually enter product and pricing information associated with the item if necessary. The shopper mobile application determines 408 if one or more special restrictions are associated with the item. As described previously, special restrictions include age restrictions (for alcohol and tobacco products), quantity/count restrictions (for high-demand items), and so on.

If the shopper mobile application determines that special restrictions do not apply, it simply adds 412 the item to a digital basket which lists all items currently marked for purchase.

If the shopper mobile application determines that special restrictions do apply, it then determines 410 if the purchase is allowable. This could include looking up the age of the customer (to see if he/she is old enough to purchase alcohol) or counting how many instances of the item have already been collected for purchase (in the case where a retailer institutes a purchase limit for each customer).

In one embodiment, the shopper mobile application determines allowability by requesting information from the online shopping concierge service. For example, the inventory management engine extracts purchasing rules from the inventory database and transmits them to the shopper mobile application. In another embodiment, the shopper mobile application maintains a local record of purchasing rules and accesses or references it as required.

Returning to FIGS. 4A and 4B, if the shopper mobile application determines that purchase of the item is allowable, it adds 412 the item to the digital basket. At the same time, the shopper physically collects the item.

If the shopper mobile application determines that purchase of the item is not allowable, then the application determines 414 if any items are remaining on the order. If there are, the shopper proceeds to locate 404 the item (and continue as previously described). If not, the shopper mobile application, responding to input from the shopper, tokenizes 416 the basket. Tokenization involves determining a final list of items for purchase. In one embodiment, the shopper mobile application transmits an identification of each item to the shopping assistance platform, which matches each item against the customer order and verifies that the order has been fulfilled.

Subsequently, the shopper mobile application determines 418 a total gross merchandise value (GMV) for the basket of items. The GMV reflects the price that a customer would pay at a physical point of sale within the store. Tokenization may also involve determining whether one or more discounts, promotions, or other price changes apply, and adjusting the GMV accordingly. The shopper mobile application then directs the online shopping concierge service to execute 420 a credit card payment to the retailer in the amount of the GMV. At this time or some time thereafter, the online shopping concierge service transmits 422 details of the transaction to the retailer. The details include which items were purchased and how much was paid for each. Asynchronously, the shopper delivers 424 the order to the customer.

Figure 5:
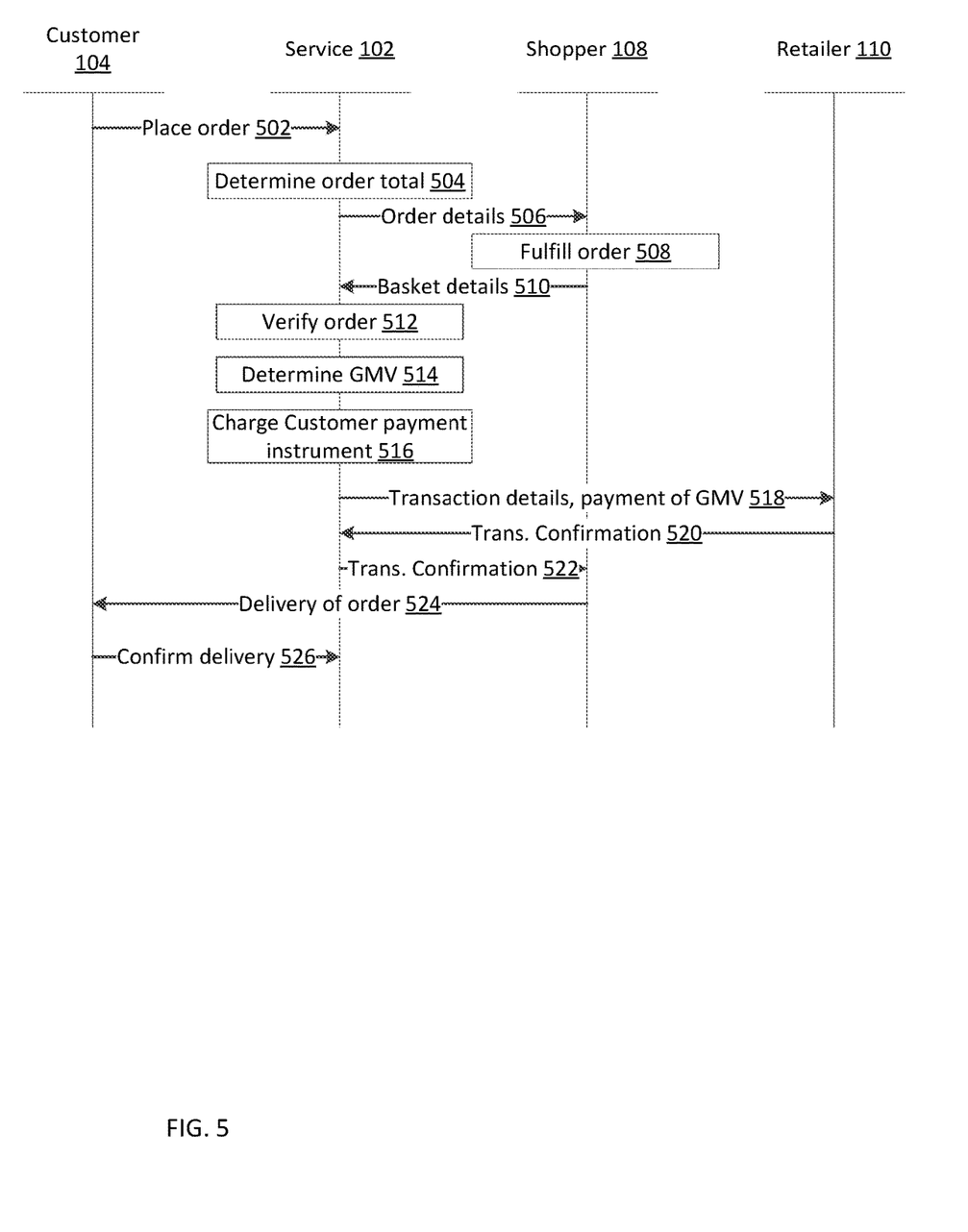
FIG. 5 is an object interaction diagram describing a first method for fulfilling an order via a shopping assistance platform, according to one embodiment.

FIG. 5 is an object interaction diagram describing a first method for fulfilling an order via a shopping assistance platform, according to one embodiment. A customer places 502 and order requesting one or more items. The customer places the order on via the customer mobile application or via a website associated with the shopping assistant system. The online shopping concierge service determines 504 an order total. The system then transmits 506 the order details to a shopper. The shopper fulfills 508 the order (as described previously with reference to FIG. 2). Once the shopper has fulfilled the order, he/she transmits 510 the basket details to the system. The system verifies 512 that the order has been fulfilled satisfactorily. The system then determines 514 a GMV which represents a total value of the order owed to the retailer. The system then charges 516 a payment instrument associated with the customer. The system then transmits 518 payment to the retailer in the amount of the GMV, as well as a summary of transaction details. The retailer returns 520 a transaction confirmation to the system. The system shares 522 the transaction confirmation with the shopper. The shopper then delivers 524 the order to the consumer. The customer, upon receiving the ordered items, returns 526 a confirmation of delivery to the server.

Cost Reduction Via Direct Transaction

In a traditional transaction flow, the online shopping concierge service 102 charges a customer payment instrument at the time an order is placed. The service 102, based on an estimation of the funds required to purchase the order items, transfers funds to a stored value or prepaid card in the possession of a shopper 108. The shopper 108 then fulfills the order, and pays for the items using the card. Consequently, in order to collect payment from a customer 104 and enable a shopper 108 to pay for the ordered items, the service 102 must bear processing costs and feeds associated with two separate card transactions.

The process described above with reference to FIG. 5 enables a more efficient and lower-cost transaction flow. As described, the service 102 determines the GMV of a basket of items submitted by a shopper 108. The service 102 then determines a service charge for the order (based on a flat rate, percentage, or combination thereof) and charges a payment instrument associated with the customer 104 for the total value of the GMV and the fixed service charge. The service's registered payment processor or aggregator, based on a prior agreement with the service, performs a bifurcation of the customer's payment, wherein it transfers the GMV to a merchant account associated with the retailer 110 and the service charge to a merchant account associated with the service 102. As a result, only a single card transaction is required, thereby lowering the card processing fees charged to the service 102. Additionally, in some cases, the processing fee paid by the service 102 is assessed on the service charge only, and not the total order value.

Accelerated Checkout

In another embodiment, the shopper 108 passes through the same check-out process as any other customer at the store. The shopper must therefore present an identification of the items for purchase as well as a payment instrument with which he/she will pay for the items. Typically, check-out cashiers scan each item individually and a point-of-sale (POS) system determines and displays a total sale price. The process of scanning each item individually is time-consuming.

In some embodiments, a shopper 108 utilizes the shopper mobile application 112 to accelerate the traditional checkout process at a retailer 110. As described with reference to FIG. 2, the shopper 108 scans using the SMA 112 each item he/she collects within the retailer 110. The image encoder 326 of the shopping mobile application 112, as described previously, is configured to encode details of a basket into a readable image, such as a QR code (as described previously). In order to accelerate the process of check-out at a point of sale of the retailer 110, the shopper 108 displays an encoded image at the point of sale. The encoded image describes the basket and all the items it contains (including their quantity, price, SKU, etc.). A cashier or other employee associated with the retailer 110 therefore reads, captures, or scans the encoded image and extracts an identification of the items for purchase. The shopper 108 then presents a payment instrument which is used to pay for the items.

Figure 6:
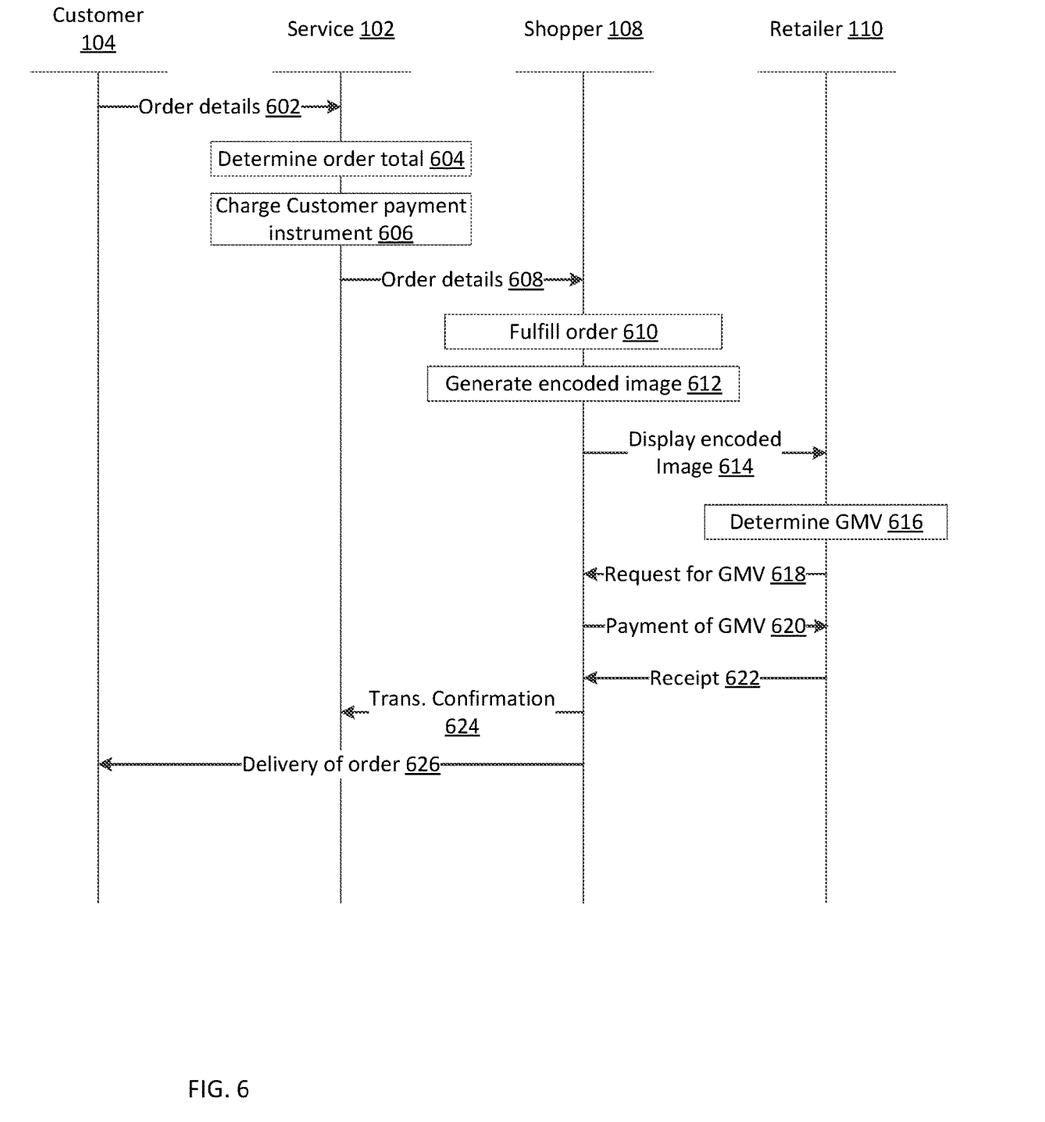
FIG. 6 is an object interaction diagram describing a method of accelerated checkout, according to one embodiment.

FIG. 6 is an object interaction diagram describing a method of accelerated checkout, according to one embodiment. A customer places 602 and order requesting one or more items. The customer places the order on via the customer mobile application or via a website associated with the shopping assistant system. The online shopping concierge service determines 604 an order total. The system then charges 606 a payment instrument associated with the customer. The system then transmits 608 the order details to a shopper. The shopper fulfills 610 the order (as described previously with reference to FIG. 2). Once the shopper is finished collecting items within the retailer 110, he/she uses the SMA to generate 612 an encoded image. As described previously, the encoded image contains information describing each item in the basket, such as its price, quantity, weight, SKU, serial number, and so on. In one embodiment, this encoded image is a QR code. The shopper displays 614 the encoded image to a cashier (or other employee) of the retailer, who scans it to determine which items have been collected for purchase. The cashier scans the encoded image using an image reader or other electronic device which extracts the information encoded in the image. A computer system subsequently determines 616 a GMV which is owed to the retailer. The cashier requests 618 payment of the GMV from the shopper. The shopper presents a payment instrument (such as a credit or debit card) and pays 620 the GMV. The cashier transmits 622 a physical or electronic receipt to the shopper. The shopper, using his/her shopper mobile application, returns 624 a confirmation of successful purchase of the basket to the online shopping concierge service. At some subsequent point in time, the shopper 108 delivers 626 the purchased items to the customer.

It should be noted that one or more aspects of the previously described process may vary. For example, in some embodiments, the shopper 108 may use a self-service automated machine which is configured to read the encoded image. Additionally, instead of encoding basket details into an encoded image, the SMA 112 may instead transmit the basket data via one of multiple communications technologies or protocols, including but not limited to: RFID, Bluetooth, NFC, WiFi, and so on. In one embodiment, the shopper 108 is able to tap his/her mobile device to a device at the physical check-out, whereby the SMA 112 transmits the basket details to the device. The shopper can then pay for the items using one of multiple possible payment methods (debit/credit card, cash, etc.).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for completing a check-out at a physical retailer, the method comprising:
  within a premises of the physical retailer, locating each item of an order, the order specifying one or more items to be purchased at the physical retailer;
  scanning each item using a mobile application running on a mobile device, the scanning causing the mobile application to add the item to a basket of items;
  generating a machine-readable code encoding information describing each item in the basket of items;
  displaying the machine-readable code from the mobile application to an image reader at the physical retailer, wherein the image reader is configured to scan the machine-readable code and extract information describing each item in the basket of items from the machine-readable code;

determining a total store value for the basket of items; and initiating a payment, by the mobile application, of the total store value to the physical retailer.

2. The method of claim 1, wherein the order is received at the mobile application running on the mobile device and the method further comprises:

delivering the items to a customer upon payment to the physical retailer.

3. The method of claim 1, further comprising:

determining that a purchase of each item in the basket of items is allowable;

identifying a store price of each item; and identifying quantity or quality information associated with each item.

4. The method of claim 3, wherein determining that the purchase is allowable further comprises:

accessing a set of inventory sale restrictions;

identifying one or more sale restrictions associated with the item;

accessing a customer profile associated with the order; and determining if at least one of the identified sales restrictions applies to the customer profile.

5. The method of claim 4, wherein the set of inventory sale restrictions is provided by the physical retailer to a system associated with the mobile application.

6. The method of claim 1, wherein initiating a payment, by the mobile application, of the total store value to the physical retailer comprises:

determining a service charge associated with the order;

determining a total order cost based on a sum of the service charge and the total store value;

charging the total order cost to a payment instrument of a customer; and transmitting, by the mobile application to the physical retailer, a portion of the total order cost equal to the total store value.

7. The method of claim 1, further comprising:

displaying, via an interface on the mobile device, a confirmation of successful payment.

8. The method of claim 1, further comprising:

receiving, via an interface on the mobile device, product and price information for an item of the order, the product and price information manually entered via the interface.

9. The method of claim 1, wherein scanning each item using the mobile application running on a mobile device further comprises:

receiving information from an inventory database for the physical retailer describing inventory information about the item.

10. A non-transitory computer-readable storage medium storing instructions for completing a check-out at a physical retailer, the instructions when executed causing a processor to:

scan each item of an order using a mobile application running on a mobile device, the scanning causing the mobile application to add the item to a basket of items, the order specifying one or more items to be purchased at the physical retailer;

generate a machine-readable code encoding information describing each item in the basket of items;

display the machine-readable code from the mobile application to an image reader at the physical retailer, wherein the image reader is configured to scan the machine-readable code and extract information describing each item in the basket of items from the machine-readable code;

determine a total store value for the basket of items; and initiate a payment, by the mobile application, of the total store value to the physical retailer.

11. The non-transitory computer-readable storage medium of claim 10, wherein the order is received from an online shopping concierge service.

12. The non-transitory computer-readable storage medium of claim 10, wherein instructions when executed further cause the processor to:

determine that a purchase of each item is allowable;

identify a store price of each item; and identify quantity or quality information associated with each item.

13. The non-transitory computer-readable storage medium of claim 12, wherein the instructions that cause the processor to determine that the purchase of each item is allowable further cause the processor to:

access a set of inventory sale restrictions;

identify one or more sale restrictions associated with the item;

access a customer profile associated with the order; and determine if at least one of the identified sales restrictions applies to the customer profile.

14. The computer-readable storage medium of claim 13, wherein the set of inventory sale restrictions is provided by the physical retailer to a system associated with the mobile application.

15. The non-transitory computer-readable storage medium of claim 10, wherein the instructions that cause the processor to initiate a payment, by the mobile application, of the total store value to the physical retailer further cause the processor to:

determine a service charge associated with the order;

determine a total order cost based on a sum of the service charge and the total store value;

charge the total order cost to a payment instrument of a customer; and transmit, by the mobile application to the physical retailer, a portion of the total order cost equal to the total store value.

16. The non-transitory computer-readable storage medium of claim 11, wherein the instructions further cause the processor to:

display, via an interface on the mobile device, a confirmation of successful payment.

17. The non-transitory computer-readable storage medium of claim 10, wherein the instructions further cause the processor to:

receive, via an interface on the mobile device, product and price information for an item of the order, the product and price information manually entered via the interface.

18. The non-transitory computer-readable storage medium of claim 10, wherein the instructions that cause the processor to scan each item of an order using a mobile application running on a mobile device further cause the processor to:

receive information from an inventory database for the physical retailer describing inventory information about the item.

* * * * *